3,729,510
PROCESS FOR HYDROXYALKYL ARYLAMIDES AND IMIDES

Richard V. Norton, Wilmington, Del., assignor to Sun Oil Company, Philadelphia, Pa.
No Drawing. Filed Apr. 19, 1971, Ser. No. 135,380
Int. Cl. C07c *103/78;* C07d *27/16*
U.S. Cl. 260—326 A                    8 Claims

ABSTRACT OF THE DISCLOSURE

A process for hydroxyalkyl aryl amides which comprises heating at reflux an alkanolamine with the ammonium salt of an aromatic acid.

---

Aromatic hydroxyalkyl amides such as bis-2-hydroxyethyl terephthalamide are known compounds and are of value as intermediates for plasticizers for high polymers and as intermediates for synthetic resins and fibers (see U.S. 2,824,016). Various preparative methods for such compounds have been used heretofore, involving either the diacid ester or the acid chloride. For example, Zinner et al. report that 77% is the maximum yield obtainable when diethanolamine is reacted with the methyl or ethyl esters of terephthalic acid (J. Prakt. Chem. 17, 147–153, 1962). Cornwell in U.S. 2,824,016 discloses 97% to 98% yields of the amides by reaction of diethylphthalate with ethanolamine in refluxing ethanol.

It has now been found possible to obtain high conversions and yields of hydroxylalkyl aryl amides of structure $Ar[CONH-R-OH]_n$ where Ar is an aryl radical, R is an alkylene group of two to four carbon atoms, and $n$ is one to four, by refluxing an ammonium salt of an aromatic acid of structure $Ar(COOH)_n$ with an alkanolamine of structure $HO-R-NH_2$ where Ar, R and $n$ are defined above. As illustrated by the disclosure in U.S. 2,824,016 the esters of these compounds are plasticizers for high polymers.

The aromatic acid salts used in the process of the invention will include those of benzenes, naphthalenes, anthracenes, and the like but will preferably be benzene derivatives and, most preferably, phthalates; i.e., Ar is phenyl and $n$ is two. It is also to be understood that either monoammonium salts or polyammonium salts may be employed. Thus, in lieu of using diammonium isophthalate as a reagent, the monoammonium salt of isophthalic acid is equally useful. When an aromatic polycarboxylic acid salt is used as reagent where the carboxylic acid groups are adjacent (i.e., ortho), the product will be predominantly the cyclic imide resulting from ring closure. Most preferred starting aromatic acid ammonium salts are the mono- and diammonium salts of isophthalic and terephthalic acids. The useful alkanolamines will include those containing up to four carbon atoms.

The process of the invention is readily carried out simply by refluxing the reactants in an excess of the alkanolamine. As reaction progresses, the heterogeneous starting mixture of alkanolamine and carboxylic acid salt becomes homogeneous. Preferably, the amount of alkanolamine used will be two to four moles per mole of acid, but, in general, the amount of alkanolamine which may be used will be from one to ten moles per mole of acid salt. It will be understood that the temperature of the process is controlled by the reflux temperature of the alkanolamine used. Thus, a reaction temperature range of from about 160° C. (monoisopropanolamine, B.P. 159.6° C.) to about 180° C. (2-amino-1-butanol, B.P. 178° C.) will be used.

Completion of the reaction is readily indicated by cessation of ammonia evolution. The ammonia, of course, can be recovered in the conventional manner to make the process more economical. The reaction product crystallizes from the reaction mass on cooling and is readily filtered off and recovered. The filtrate may also be re-cycled with fresh reactant to an appropriate reaction vessel such as a stirred tank reactor held at reaction temperature and in that way the product amide is continuously produced with yields approaching 100%.

In order to further illustrate the invention the following examples are given:

EXAMPLE 1

Four moles of diammonium isophthalate are added to sixteen moles of monoethanolamine and held at reflux (167°–172° C.). At the end of twenty-four hours 86.5% of available $NH_3$ is removed. The reaction mass is cooled and filtered. The solid bis(2-hydroxyethyl) isophthalamide (M.P. 225°–226° C.) is obtained in 80% yield based on 86.5% conversion.

EXAMPLE 2

Instead of using the diammonium salt in Example 1, the monoammonium salt is used with essentially the same results.

EXAMPLE 3

Following the essential details of Example 1, the diammonium salt of naphthalene-1, 6-dicarboxylic acid (two moles) reacts with 2-aminopropanol (six moles) at reflux (173°–176° C.) to give the bis[N(2-hydroxy-1-methyl)ethyl] amide of naphthalene-1, 6-dicarboxylic acid in good yield. The diethyl ester of this compound acts as a plasticizer for thermoplastic cellulose esters such as cellulose nitrate.

A significant advantage of the process of this invention lies in the fact that preparation of the product amides may be made directly from the hydrolysis product of an aromatic nitrile without costly intermediate steps to isolate the free acid and convert it to an ester. Thus, an alkyl aromatic hydrocarbon such as p-xylene may be subjected to ammoxidation by known techniques to give terephthalonitrile which on hydrolysis yields the mono- or diammonium salts of terephthalic acid. Such salts are directly useful in the process of subject invention and thus the invention provides a valuable contribution to the art.

The invention claimed is:

1. A process for preparation of a hydroxyalkyl aryl amide of structure $Ar[CONH-R-OH]_n$ where Ar is selected from the group of benzene, naphthalene and anthracene, R is an alkylene group of two to four carbon atoms, and $n$ is one to four by refluxing a mono- or polyammonium salt of an aromatic acid of structure $Ar(COOH)_n$, where, when $n$ is greater than one, said $(COOH)_n$ groups are non-adjacent to each other, with an alkanolamine of structure $HO-R-NH_2$ where Ar, R, and $n$ are defined above.

2. The process of claim 1 where the aromatic acid salt is an ammonium isophthalate.

3. The process of claim 2 where the alkanolamine is monoethanolamine.

4. The process of claim 1 where the aromatic acid salt is diammonium isophthalate and the alkanolamine is monoethanolamine.

5. The process of claim 1 where the acid is terephthalic acid and the alkanolamine is monoethanolamine.

6. The process of claim 1 where the aromatic acid salt is an ammonium salt of a naphthalene-dicarboxylic acid.

7. The process of claim 1 where the aromatic acid salt is the diammonium salt of naphthalene-1, 6-dicarboxylic acid and the alkanolamine is 2-aminopropanol.

8. A process for preparation of a hydroxyalkyl aryl amide of structure $Ar[CONH-R-OH]_n$ and the cyclic imide resulting from ring closure of said amide where Ar is selected from the group of benzene, naphthalene and anthracene, R is an alkylene group of two to four carbon atoms, and $n$ is two to four by refluxing a mono- or polyammonium salt of an aromatic acid of structure Ar$\text{+(COOH)}_n$ where said $\text{+(COOH)}_n$ groups are adjacent to each other with an alkanolamine of structure $$\text{HO—R—NH}_2$$

where Ar, R, and $n$ are defined above.

References Cited
UNITED STATES PATENTS 3,275,651  9/1966  Ellis et al. _____ 260—558

HARRY I. MOATZ, Primary Examiner

U.S. Cl. X.R.

260—558 R, 559 A, 326 N